Jan 6, 1931.  T. C. HUTSON  1,787,907
SEWER PIPE
Filed Nov. 16, 1927

Inventor
T. C. Hutson.
By Lacey & Lacey, Attorneys

Patented Jan. 6, 1931

1,787,907

UNITED STATES PATENT OFFICE

THOMAS C. HUTSON, OF PORT HOMER, OHIO

SEWER PIPE

Application filed November 16, 1927. Serial No. 233,668.

The present invention is directed to improvements in sewer pipes.

The primary object of the invention is to provide a pipe made up of sections so constructed that they may be quickly assembled to provide a continuous conduit of maximum strength.

Another object of the invention is to provide a device of this nature wherein the sections can be united along their longitudinal edges and ends in such manner as to positively prevent leakage.

Another object of the invention is to provide a pipe formed from a plurality of mating sections which can be easily and quickly placed in assembled relationship to provide a continuous conduit for various purposes.

In carrying out my invention I employ a plurality of transversely curved sections 1, which when placed with their longitudinal edges and ends together form a continuous conduit.

Figure 1:
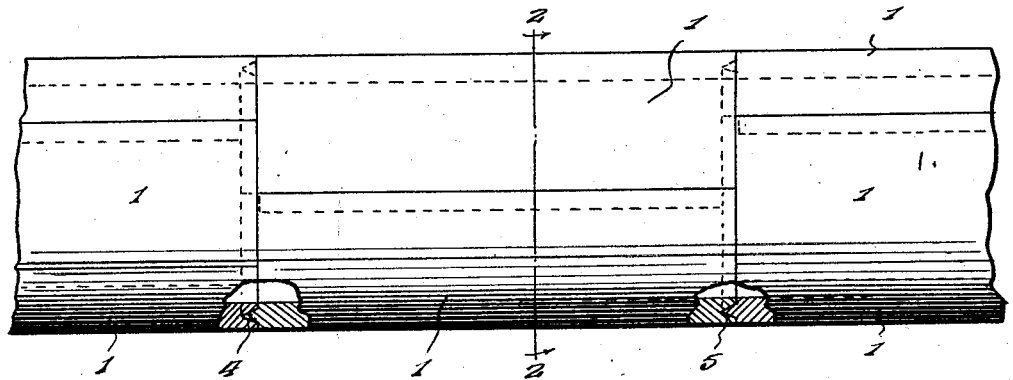
Figure 1 is a side elevation of a portion of a pipe constructed in accordance with the invention.
Figure 2:
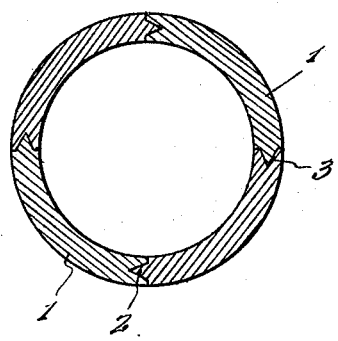
Figure 2 is a sectional view on line 2—2 of Figure 1.

The sections may be formed from cement, fire clay, iron, steel, or from any material suitable for the purpose. It will be observed upon reference to Figure 1 that four sections are used, but it will be of course understood that two may be used for each length, or the number may be increased if found desirable.

Each section has its longitudinal edges provided with a tongue and groove 2 and 3 of V-shaped formation. The respective ends of the sections are likewise provided with tongues and grooves 4 and 5 which are adapted to intimately engage with each other when the tongues 2 and grooves 3 are engaged. Since these tongues and grooves are of V-shaped formation a tight joint will be assured when the sections are placed in assembled relationship. In order to assure a tight joint the respective grooves may be wiped with liquid cement before the tongues are placed therein. The ends of the grooves 3 are closed by tapered walls 3' for engagement with the tapered ends 4' of the tongues 2, thus providing a snug end fit to prevent endwise movement of the tongues in the grooves.

Figure 4:
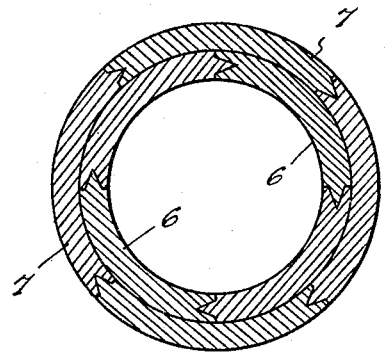
Figure 4 is a transverse sectional view of a modified form of the invention.
Figure 3:
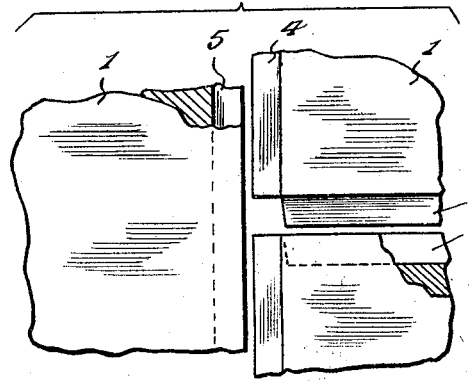
Figure 3 is a detail side elevation of the sections in nonassembled relationship.

In Figure 4 a plurality of inner sections 6 are arranged within a plurality of outer sections 7 and are connected in the same manner as the sections 1 of the preferred form of the invention. By arranging the sections 6 and 7 in concentric relation an extremely strong pipe is provided.

While I have illustrated the sections with their ends coinciding, it will be of course understood that they may be assembled in "break joint" fashion, the terminals being finished with half length sections in order that even ends will be provided.

From the foregoing description it will be seen that a pipe has been provided which can be conveniently laid and by minor modifications various shaped pipes can be provided, and while I have described my invention more particularly for use as a sewer pipe, it will be of course understood that the construction may be used for chimneys, flues, cable conduits, or for any purpose desired.

Having thus described the invention, I claim:

A pipe including a plurality of transversely curved sections having abutting side and end edges provided with tongues and grooves V-shaped in cross section and of less thickness than the sections to provide the edge faces of the sections with flat abutting surfaces at opposite sides of the tongues and grooves, the tongues extending along sides of the sections having beveled ends and the grooves for receiving the same having beveled end walls for engaging the ends of the beveled tongues when the tongues and grooves are in interfitting engagement.

In testimony whereof I affix my signature.

THOMAS C. HUTSON. [L. S.]